(12) United States Patent
Vainer et al.

(10) Patent No.: US 8,664,908 B2
(45) Date of Patent: Mar. 4, 2014

(54) METHOD AND DEVICE FOR AN INDUCTION MOTOR START

(76) Inventors: Zvi Vainer, Beer-Sheva (IL); Boris Epshtein, Beer-Sheva (IL)

( * ) Notice: Subject to any disclaimer, the term of this patent is extended or adjusted under 35 U.S.C. 154(b) by 166 days.

(21) Appl. No.: 13/120,131

(22) PCT Filed: Sep. 24, 2009

(86) PCT No.: PCT/IL2009/000921
§ 371 (c)(1),
(2), (4) Date: Mar. 21, 2011

(87) PCT Pub. No.: WO2010/052699
PCT Pub. Date: May 14, 2010

(65) Prior Publication Data
US 2011/0285341 A1   Nov. 24, 2011

(30) Foreign Application Priority Data
Nov. 4, 2008   (IL) .......................................... 195102

(51) Int. Cl.
*H02P 1/16* (2006.01)
*H02P 1/26* (2006.01)
(52) U.S. Cl.
CPC .................................... *H02P 1/26* (2013.01)
USPC .............................. 318/778; 318/767; 318/727

(58) Field of Classification Search
CPC .......................................................... H02P 1/26
USPC ........................................... 318/778, 767, 727
See application file for complete search history.

(56) References Cited

U.S. PATENT DOCUMENTS 4,926,105 A * 5/1990 Mischenko et al. .......... 318/800
5,350,992 A * 9/1994 Colter ........................... 318/807

* cited by examiner

*Primary Examiner* — Bentsu Ro
*Assistant Examiner* — David Luo
(74) *Attorney, Agent, or Firm* — P. G. Scott Born; Foster Pepper PLLC

(57) ABSTRACT

An object of the present invention is providing permissible values of start currents with sufficiently high start torque ensuring the possibility of the start of a loaded motor, the smoothness of the motor's start, without spikes and fluctuations of the currents, voltages and torques. The other objects of the proposed device are simplicity, reliability and economic efficiency. The proposed method of an induction motor start includes an acquisition of two components of the voltage, feeding the motor. The both components have the different controlled frequencies and root mean square values. The proposed device for an induction motor start comprises two channels forming signals, which create two corresponding components of the motor's feeding voltage.

16 Claims, 8 Drawing Sheets

METHOD AND DEVICE FOR AN INDUCTION MOTOR START

PRIORITY CLAIM

This application is the U.S. National Phase of International Application No. PCT/IL2009/00921 filed Sep. 24, 2009, which designated the U.S. and claims priority to Israeli Application Ser. No. IL195102 filed Nov. 4, 2008, the entire contents of each of which are hereby incorporated by reference.

BACKGROUND OF THE INVENTION

1. Field of the Invention

The present invention relates to electric drives and is directed particularly to start, braking and speed regulation of induction motors, as well as to synchronous motors start, which are started by the method of the asynchronous start.

2. State of the Art

The main requirements of the methods and devices for the induction motor start, and also asynchronous start of the synchronous motors, are:

relatively low start current.

It is known that the high start current of the motor requires excessive energy supply and, respectively, more powerful feeding equipment used only at the moment of the motor's start. Besides, the high start current shortens lifetime of the motor because of electrical and mechanical impacts at the moment of the start, and also leads to the essential overheat of the motor and to the extra consumption of the energy under the high repetitions of the starts.

the start torque, high enough to ensure the possibility of the start of the loaded motor.

the smoothness of the start process without fluctuations and spikes of currents, voltages and torques.

the absence of the device influence on the motor operation and feeding network after the motor's start process is finished.

the simplicity, reliability and economic efficiency of the device.

The "Soft Start" of the induction motor is a well known and widely used method in practice. Hereby, the start process of the motor, the voltage value feeding the motor is gradually increased up to its rated value.

The main disadvantage of this method, under the condition of the permissible start current supply, is a low start torque that does not allow using it under relatively high load of the motor. This method is used, as a rule, for the start of an unloaded motor and requires additional equipment for the subsequent application of the load.

Another well known method of the induction motor start is a method in which the frequency and the value of the feeding voltage in the process of the start are increased up to their rated values (U.S. Pat. No. 4,357,655). In order to implement this method the device includes the inverter with the direct current intermediate link.

The disadvantage of this device is a relative complexity of the inverter design, and the device reliability is not high enough, caused by the necessity of the forced turning off of its power elements.

In addition, after completion of the start process, the inverter negatively influences the power characteristics of the motor in the operating regime, namely, it leads to the significant losses of the energy in the motor and in the inverter, to reduction of the electromagnetic torque of the motor and to the impossibility of the energy recuperation of the motor, that in turn reduces the economic efficiency of this method and device.

The expensive and large electromechanical contactors are required after the completion of the start process in order to turn off the inverter, that essentially complicates the device, enlarges its size and decreases the economic efficiency.

There is also known method of the induction motor start (R. BRZESINSKY, V. I. CHRISANOV. "Reliable and Intelligent Technology of Soft-Starting Electrical Machines". Proceeding of the $5^{th}$ UEEES'01, 2001, Szchecin, Poland, supplement vol., pp 179-182.) in which the motor feeding voltage frequency increases up to the supplied voltage frequency. The low frequency voltage is formed by means of the sequence of half waves of the supplied voltage. The amount of half waves for each frequency is changed discretely by the preset ratio.

This method avoids the disadvantages mentioned in two previous methods, however it does not provide the smoothness of the start process, i.e. the spikes and fluctuations of currents, voltages and torques because of discrete frequency change, are present.

SUMMARY OF THE INVENTION

An object of the present invention is providing permissible values of start currents.

Another object of the invention is sufficiently high start torque ensuring the possibility of the start of a loaded motor.

The smoothness of the motor's start, without spikes and fluctuations of the currents, voltages and torques, is an additional goal of the invention.

An additional object of the invention is the absence of the influence of the proposed device both on motor operation and on voltage supplying network after the start process is finished.

Finally, simplicity, reliability, and economic efficiency are the other objects of the proposed device.

The said and another objects are achieved by the following: the proposed method of an induction motor start includes an acquisition of first component of the voltage, feeding the motor, the said first component is increasing in magnitude by means of modulating the value of the feeding voltage, acquisition of second component of the voltage, feeding the motor by means of modulating the value and frequency of the feeding voltage, simultaneous application of first and second components of the voltage to each winding of the motor, second component with initial frequency less than frequency of first component, increasing of initial frequency of the second component up to its final value which is less than the frequency of first component.

The indicated and the other purposes are also achieved by the following: the proposed device for an induction motor start comprises the first channel forming the first signal, creating the first component of the motor's feeding voltage from the feeding voltage, first channel containing the set up unit of the value change of first component.

The second channel forming the second signal, creating the second component of the motor's feeding voltage from the feeding voltage contains a set up unit of the value change of second component, having as an output the signal of the value change of second component, a signal generator of second component frequency, a set up unit of the behavior change of said frequency of the signal generator of second component frequency, combined signal of the value change of the second component and modulating signal of a signal generator of second component frequency of second component, are second signal, a logical multiplication unit of second signal from the signal of the value change of the second component and variable frequency modulating signal.

A logic summation unit of first and second signals, has a control signal as its output, a controlled power unit, feeding the motor by the resulting voltage, corresponding to control signal, controlled power unit is a bidirectional power unit.

The present invention will be understood more fully from the detailed description given herein below and from the accompanying drawings of the preferred embodiment of the invention which, however, should not be construed as exhaustive to the invention but are for explanation and understanding only.

BRIEF DESCRIPTION OF THE DRAWINGS

The essence of the invention is illustrated by the drawings which follow.

DETAILED DESCRIPTION OF THE PREFERRED EMBODIMENTS OF THE INVENTION

The method given below describes the start of the multiphase induction motor using the example of the forming of the single phase motor feeding voltage. This method can be also used for synchronous motors with asynchronous start.

Figure 1:
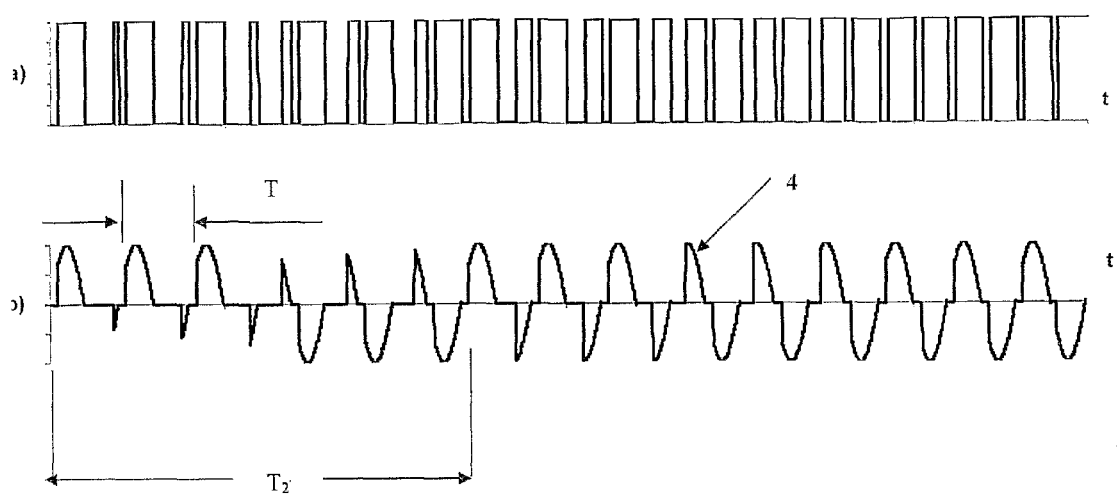
FIG. 1 demonstrates the graph of the motor feeding voltage while the motor is started, according to the proposed invention.
Figure 2:
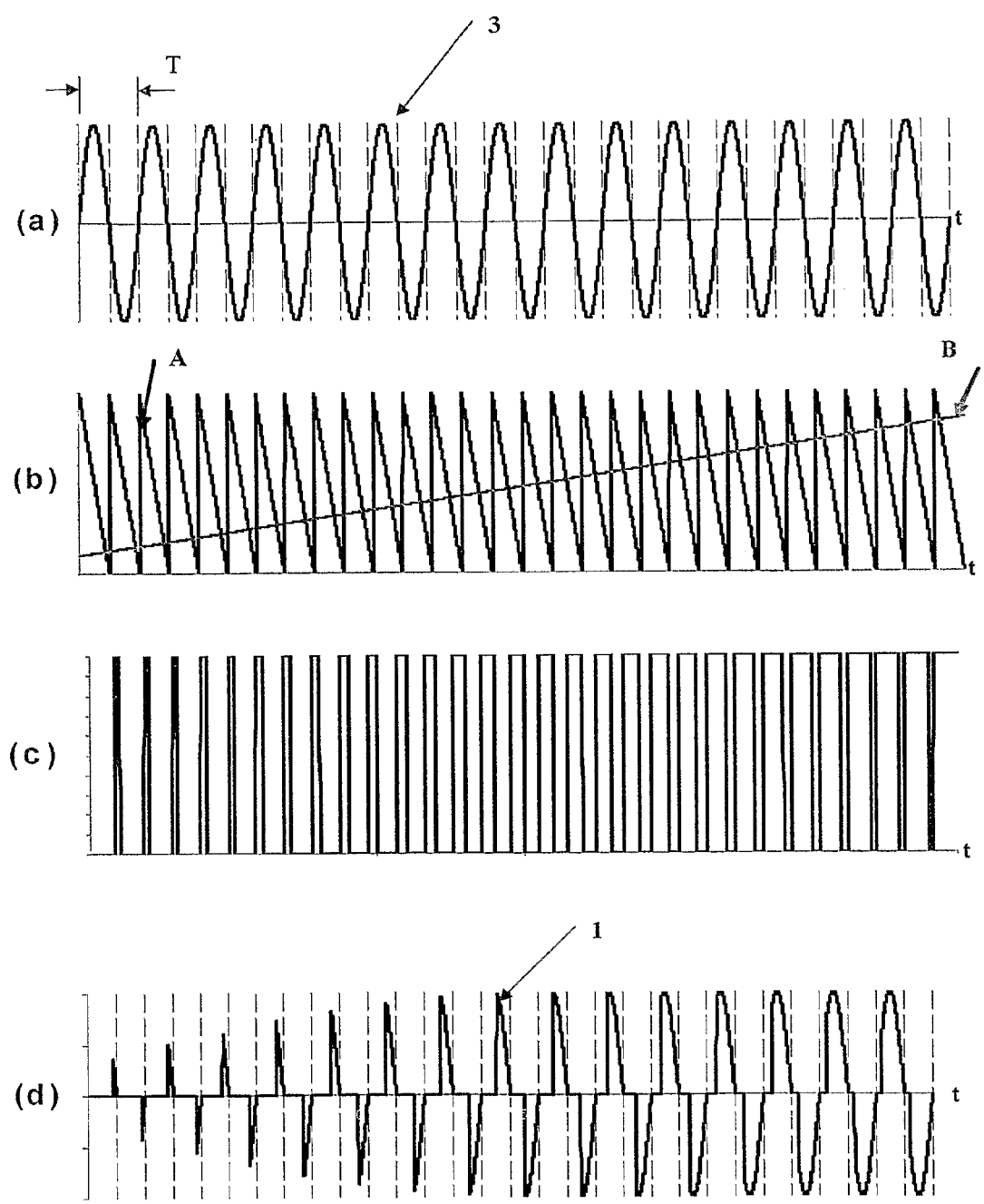
FIG. 2 demonstrates the process of forming of one of the motor feeding voltage component.
Figure 3:
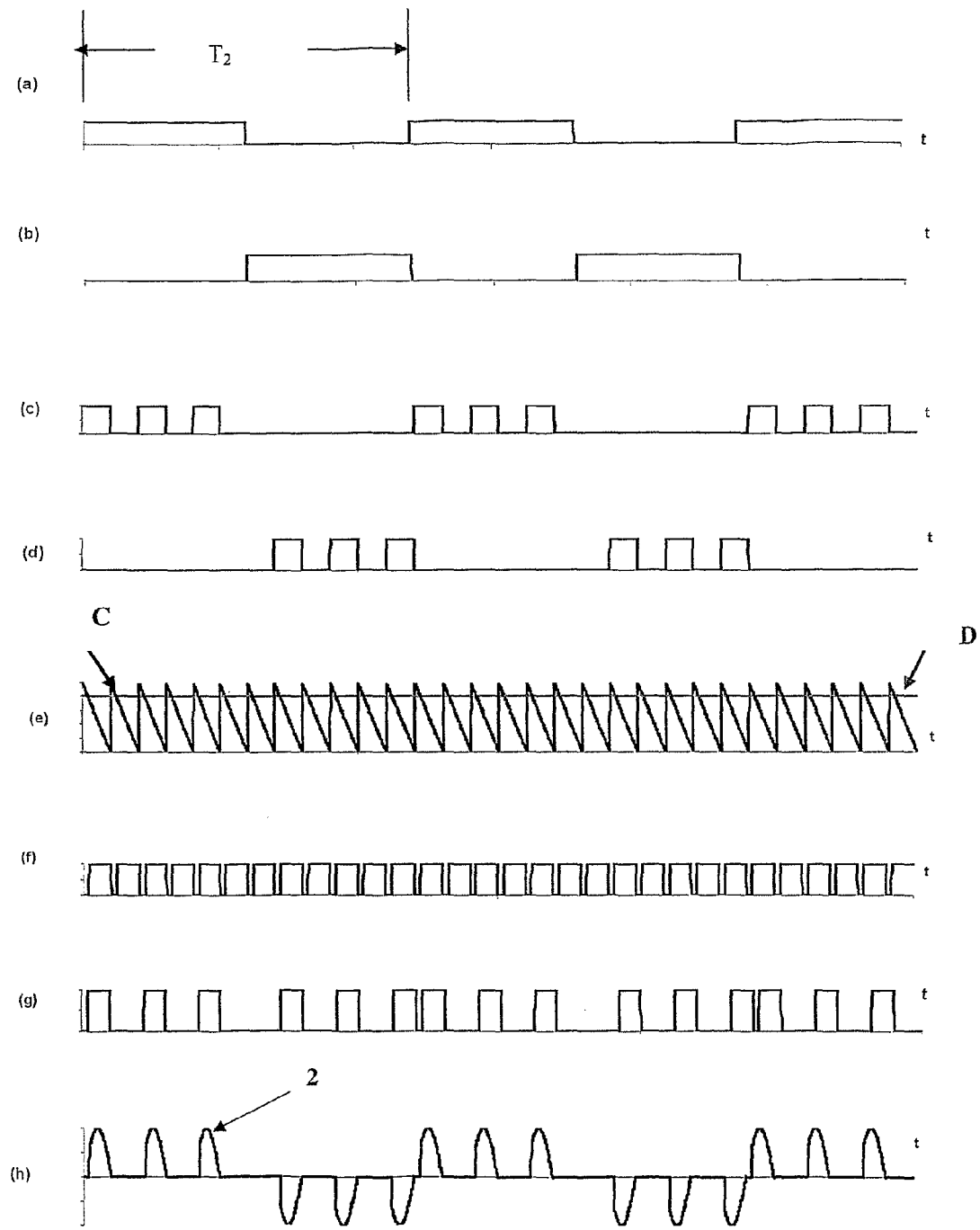
FIG. 3 demonstrates the process forming of the second of the motor feeding voltage component.

The proposed method of the motor start is based on acquiring the motor feeding voltage 4 (FIG. 1b) that includes two components: first component 1 (FIG. 2d) and second component 2 (FIG. 3h), which are obtained from feeding voltage 3 (FIG. 2a). Usage of two components allows to receive the high start torque at the relatively small start currents, and gradual increase of angular speed up to its value. This effect is achieved by the possibility of obtaining the motor feeding voltages, required form of which is changing according to the current start stage. During the motor start process, the first component 1 is increasing in value by means of modulation of the value of the feeding voltage 3 (FIG. 2a) by employing one of the known methods, for example, Pulse Width Modulation (PWM) (FIG. 2b, c). The second component 2 with initial frequency $f_2=1/T_2$ (FIG. 1), which is less than the first component 1 frequency $f_1=1/T_1$, is increased in frequency (not shown in figures) during the start process up to its final value less than the first component 1 frequency $f_1$ (FIG. 3h shows the second component 2 in one of the current moments of the motor start). The voltage value of the second component 2 is also changing at the same time. The increase of frequency $f_2$ is implemented by modulating the feeding voltage 3 by the lower frequency $f_2$ (FIG. 3a, b, c, d, h), while the change of the value of the second component 2 is carried out by modulating the feeding voltage 3 with PWM (FIG. 3e, f, g, h) at the frequency of the feeding voltage 3, and PWM is synchronised with the latter frequency. The resulting forming signal of the second component 2 (FIG. 3h) of the motor feeding voltage 4 is shown in FIG. 3g, which is obtained by logical adding of the signals shown in FIG. 3c and FIG. 3d, and subsequent logical multiplication of the obtained signal by the signal shown in FIG. 3f. The resulting forming signal is formed by taking into account the basic harmonic frequency of the second component 2 of the synchronization of the polarity of the second component 2 and of that of feeding voltage 3, as well as the value of the second component 2 set by the control signal. The single phase of the second component 2 of the motor feeding voltage 4, is shown in FIG. 3h.

The process of starting a motor unfolds as described below.

While the motor is starting, the current value of a control parameter is determined. For example, it can be an angular velocity of the motor, or the electric current value in the motor windings. The ratio of the values of the first 1 and second 2 components of the voltage 4 and the rate of the increase of the second component 2 frequency are changing depending on the current value of one of the used control parameters. In one of the version of the embodiment of the invention the determination of the control parameter may be absent, and said change in ratio of the value of the first 1 and second 2 components of the voltage, as well as change in increase rate of the second component 2 frequency are predetermined by a given program.

Figure 4:
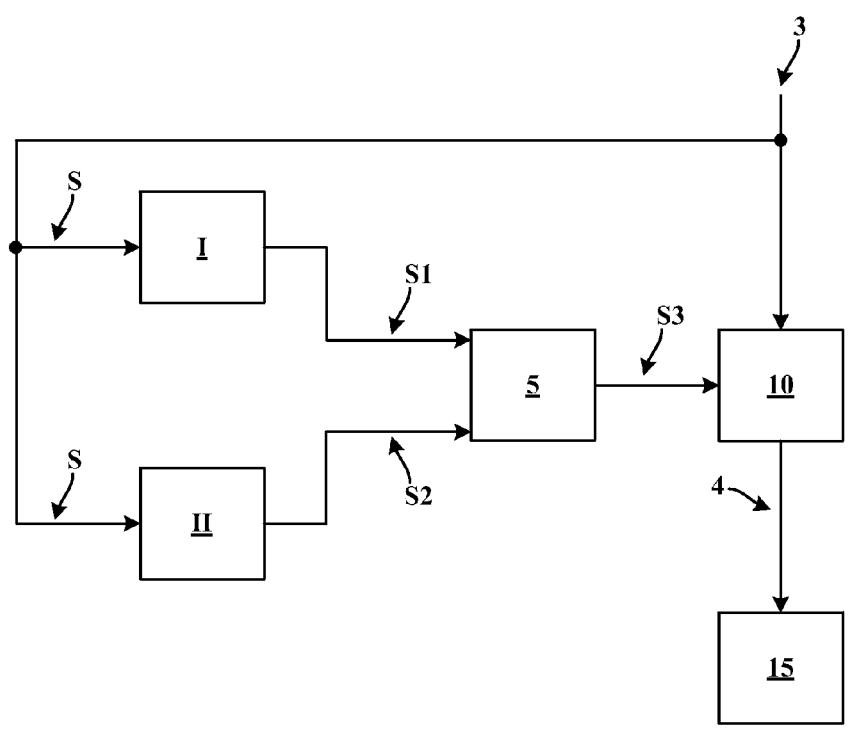
FIG. 4 demonstrates schematically the block diagram of the device for induction motor start per single phase, in one of the version of the embodiment of the invention.

The device for the induction motor start, shown in FIG. 4, includes the following: the first channel I and second channel II designated to form, respectively, the first $S_1$ and second $S_2$ signals from the signal S; logical adding unit 5 for summing signals $S_1$ and $S_2$ which produces the resulting control signal $S_3$ in its output; and controlled power unit 10 which feeds motor 15 with voltage 4 (FIG. 1b). Signal S, formed from feeding voltage 3, is synchronized with the said voltage with respect to the frequency and the phase of the voltage. This signal may be either sinusoidal or have other forms, for example, rectangular. One of the devices forming signal S can be a reducing electric transformer. Signals S, $S_1$, $S_2$ and $S_3$ are shown in FIGS. 2a, 2c, 3g, 1a, respectively. Signal $S_1$ and signal $S_2$ are designated to create the first 1 (FIG. 2d) and the second 2 (FIG. 3h) components, respectively, of motor feeding voltage 4 formed from feeding voltage 3 (FIG. 2a). The outputs of channels I and II are connected to the inputs of logical adding unit 5, output of which is connected to the input of controlled power unit 10 of the corresponding motor feeding voltage phase.

The first channel I (FIG. 5) contains the following: set up unit of the pulses width 20 which produces signal $S_{17}$ (FIG. 2b B) regulating value change of component 1 of feeding voltage 4 by PWM of signal $S_1$; periodic signal generator 25 of the first component forming periodic signal $S_4$ synchronized with feeding voltage 3 (FIG. 2a), and comparator 30 which has the said above signal $S_1$ as its output (FIG. 2c). The inputs of comparator 30 are connected to outputs of both set up unit 20 of the pulses width and periodic signal generator 25 of the first component (FIG. 5), and the output of comparator 30 is connected to one of the inputs of logical adding unit 5 (FIG. 4). In one of the versions of the embodiment of the invention the feedback signal can be applied to one of the inputs of periodic signal generator of the first component 25 (see in description above). The signal $S_4$ on the output of periodic signal generator 25 of the first component, shown in FIG. 2b-A, and one of the possible versions of control signal $S_{17}$ are shown in FIG. 2b-B.

Figure 6:
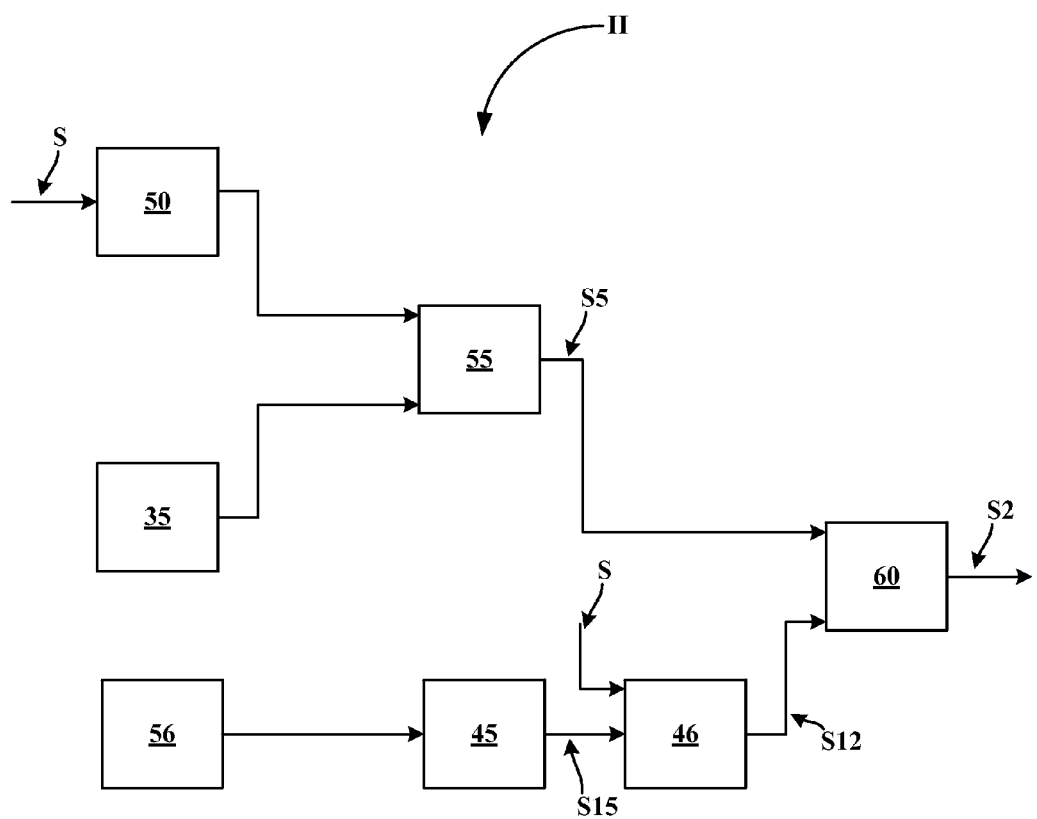
FIG. 6 demonstrates the block-diagram of the forming device of the motor feeding voltage second component in one of the version of the embodiment of the invention.

The second channel II in one of the versions of the embodiment of the invention is shown in FIG. 6. Thereby, controlled power unit 10 (FIG. 4) is represented by the bidirectional single component. Channel II includes the following: set up unit 35 of pulses width of the second signal of the value change of second component 2; periodic signal generator 50 of the second component synchronized with signal S and therefore with the frequency and phase of the feeding voltage 3 (FIG. 2a); additional comparator 37 which compares the signal set by set up unit 35 of pulses width of the second signal with feedback signal $S_{20}$; comparator 55 forming PWM of second signal, and comparator 55 has signal $S_5$ in its output (FIG. 3f); set up unit 56 of the behavior change of generator of the variable frequency modulating signal which sets frequency behavior change of frequency of the signal generator 45 of second component frequency which has in the output the signal $S_{15}$ with the frequency $f_2$ of the second component 2 where frequency $f_2$ is lower than the feeding voltage 3 frequency; the unit 46 of the synchronization of the positive and negative polarities of signals S and $S_{15}$ produces the resulting signal $S_{12}$ in its output; logical multiplication unit 60 of signals $S_5$ and $S_{12}$, which produces signal $S_2$ in its output (FIG. 3g). Thus the signal $S_2$ forms the second component of the voltage 4, and signal $S_5$ forms the second component value of the voltage 4, whereas the signal $S_{12}$ forms the frequency of the second component.

The inputs of the comparator 55 are connected to the outputs of the set up unit 35 and signal generator 50, and the output of the comparator is connected to one of the inputs of the logical multiplication unit 60. The output of the set up unit 56 is connected to the input of the generator 45, the output of which is connected to one of the inputs of the said unit 46. To the second input of the said unit 46, the synchronizing signal S with the frequency and phase of the feeding voltage 3 is connected. The output of the said unit 46 is connected to the second input of the logical multiplication unit 60. The output of the logical multiplication unit 60 is connected to the second input of the logical adding unit 5 (FIG. 4), and the output of the first channel I is connected to the first input of the logical adding unit 5.

Figure 5:
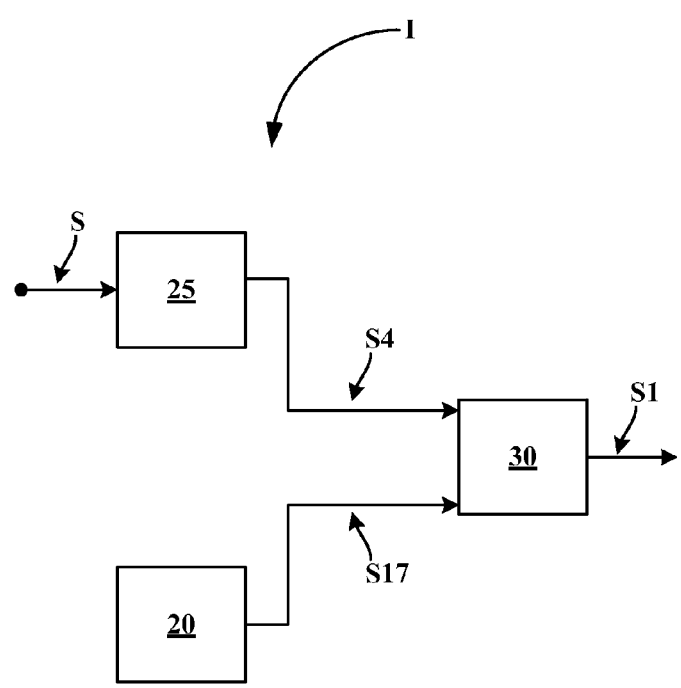
FIG. 5 demonstrates the block-diagram of the forming device of the motor feeding voltage first component in one of the version of the embodiment of the invention.

Signal generator 50 can be excluded in one of the version of the embodiment of the invention, and the signal from the output of the generator 25 of the first channel I, shown in FIG. 5, can be used instead of signal generator 50.

Figure 7:
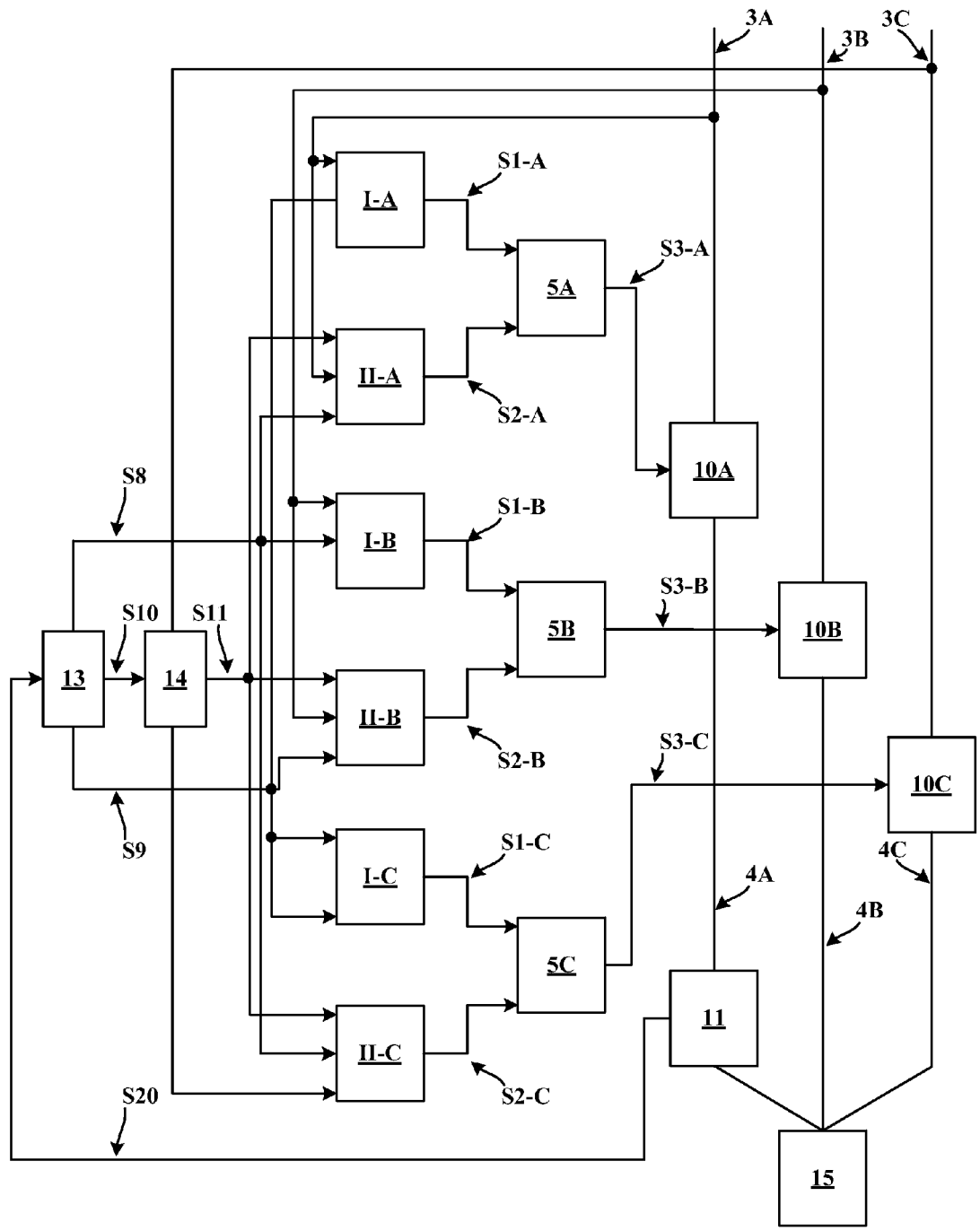
FIG. 7 demonstrates schematically the block-diagram of the induction motor start device of the three phase feeding voltage in one of the version of the embodiment of the invention.
Figure 8:
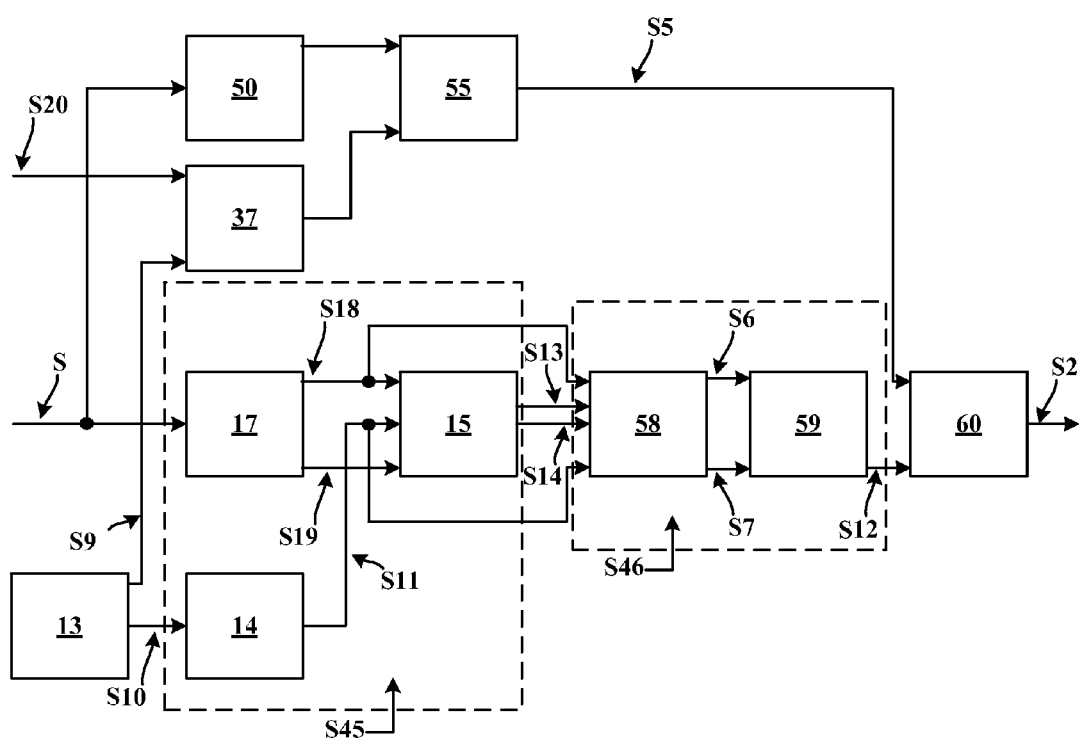
FIG. 8 demonstrates the full block-diagram of the device implementing the forming function of the frequency and phase sequence of the second component of the motor feeding three phase voltages system in one of the version of the embodiment of the invention.

The set up unit 35 and set up unit 56 can be excluded in one of the version of the embodiment of the invention, and instead of them the common set up unit 13, shown in FIGS. 7, 8, can be used.

The said unit 46 can be excluded in one of the version of the embodiment of the invention, namely, when using as the power unit two opposite-parallelly connected single directional elements in each phase of the motor's feeding voltage, so that the output of generator 45 is connected directly to one of the inputs of the logical multiplication unit 60.

In one of the version of the embodiment of the invention the variable frequency generator 14 (FIGS. 7,8) is included. The input of the variable frequency generator 14 is connected to the output of set up unit 13, and the output of generator 14 is connected to the input of the second channel II, in which signal $S_2$ is formed.

One of the version of the embodiment of the invention, namely, when using the three phase induction motor start device with the motor's current feedback is shown in FIG. 7. The abovementioned device includes the following: three power units (10A, 10B, 10C), one for each phase (A, B, C); three control systems, one for each phase, every one of them includes the first channel (I-A, I-B, I-C), the second channel (II-A, II-B, II-C); logical adding units (5A, 5B, 5C); the central set up unit 13; the variable frequency generator 14; and sensor 11 for measuring the motor's 15 electric current in one of its phases.

One of the outputs of set up unit 13 is connected to the first inputs of the first channel for each of three phases (I-A, I-B, I-C). The second output of set up unit 13 is connected to one of the inputs of the second channel for each of three phases (II-A, II-B, C). The third output of set up unit 13 is connected to the input of the variable frequency generator 14. The output of the variable frequency generator 14 is connected to the second inputs of the second channels of each phase. Each of the phases of feeding voltage 3 (3A, 3B, 3C) is connected to the corresponding second inputs of channel I and to the corresponding third inputs of channel II. The output of sensor 11 is connected to the input of set up unit 13. The outputs for each phase of channel I ($S_1$-A, $S_1$-B, $S_1$-C) and the outputs for each phase of channel II ($S_2$-A, $S_2$-B, $S_2$-C) are connected to the inputs of corresponding logical adding devices (5A, 5B, 5C), and the outputs of the latter ($S_3$-A, $S_3$-B, $S_3$-C) are connected to the inputs of the corresponding power units (10A, 10B, 10C).

Control signal $S_8$ is transmitted to channels I inputs from the output of set up unit 13 and sets the forming function of signals $S_1$, which control the first components values of the motor's feeding voltages. Control signal $S_9$ is transmitted to channels II inputs from the output of the set up unit 13, so as a result signals $S_5$ (FIG. 6) are formed, and they control the second components value of the motor's feeding voltages. Control signal $S_{10}$ is transmitted to the variable frequency generator 14 from the output of set up unit 13. Control signal $S_{11}$ is transmitted to one of the inputs of channels II (II-A, II-B, II-C) from the variable frequency generator 14, so signals $S_{12}$ (FIG. 6) are formed, and they control the second components frequency of the motor's feeding voltages. Control signals $S_2$ (FIG. 3g) are formed in logical multiplication unit 60 as a result of logical multiplication of signals $S_5$ and $S_{12}$. Control signals $S_2$ form the second components of the motor's feeding voltages. The variable frequency generator 14, in the present version of the embodiment of the invention, determines the phase sequence of the basic harmonic of the second components of the motor's feeding voltages. The feedback signal $S_{20}$ transmitted to set up unit 13 from the sensor 11 (FIG. 7) corrects the set signals $S_8$, $S_9$ and $S_{10}$ according to the current motor's operating regime. If sensors of other parameters of operating a motor, for example angular speed, are used, signals $S_8$, $S_9$ and $S_{10}$ will be corrected in accordance with the used parameters.

The detailed block-diagram of forming the second components frequency and phases sequence of the motor's feeding voltages in one of the versions without influence of feedback, shown in FIG. 8, is part of the device displayed in FIG. 7. The device includes the following: the periodic signal generator 50 produces the periodic signal synchronized with signal S; the comparator 55 produces the signal $S_5$ in its output; the additional comparator 37, comparing the said control signal $S_9$ with the feedback signal $S_{20}$; the central set up unit 13; the variable frequency generator 14; generator 17 of two rectangular signals synchronized with signal S and shifted from each other in phase by 180°; RS flip flop 18, which forms the rectangular signals $S_{13}$ and $S_{14}$ at the frequency of the second component of the motor's feeding voltage 4 and these signals are shifted from each other in phase by 180°; the polarity synchronization unit 58, which synchronizes polarities of signals $S_{13}$ and $S_{18}$ as well as polarities of signals $S_{14}$ and $S_{19}$, produces the 180° phase shifted signals $S_6$ (FIG. 3c) and $S_7$ (FIG. 3d); logical adding device 59 of the said synchronized signals $S_6$ and $S_7$, produces the logical summing signal $S_{12}$ in its output; logical multiplication unit 60 of signals $S_5$ and $S_{12}$, produces as a result the signal $S_2$ in its output.

In the present version of the embodiment of the invention the variable frequency generator 14, the generator 17 and the RS flip flop 18 operate as generator 45 (FIG. 6), and the signals $S_{13}$ and $S_{14}$ are single polar signals, which frequencies are equal to the frequency of the signal $S_{15}$, and the phases correspond to the positive and negative half periods of the signal $S_{15}$. The central set up unit 13, the additional comparator 37, the periodic signal generator 50 and the comparator 55 form the signal $S_5$ regulating the value of the second component depending on the control signal $S_9$ and the feedback signal $S_{20}$. The polarity synchronization unit 58 and the logical adding device 59 operate as the unit 46 of the synchronization of the positive and negative polarities (FIG. 6) of signals S and $S_{15}$.

One of the outputs of set up unit 13 is connected to the input of the variable frequency generator 14, and the second output of set up unit 13 is connected to one of the inputs of the additional comparator 37. The output of the sensor 11 is connected to second input of the additional comparator 37. The output of the additional comparator 37 is connected to one of the inputs of the comparator 55. The output of signal generator 50 is connected to the other input of the comparator 55. The input of signal generator 50 and the input of generator 17 are connected to the corresponding phase feeding voltage 3 (signal S). The output of the variable frequency generator 14 is connected to one of the inputs (clock) of generator 45. The outputs of generator 17 are connected to two other inputs of generator 45. The same outputs of generator 17 are connected to two inputs of the polarity synchronization unit 58. The outputs of generator 45 are connected to two other inputs of the polarity synchronization unit 58. Two outputs of the polarity synchronization unit 58 are connected to two inputs of the logical adding device 59, the output of which is connected to one of the inputs of logical multiplication unit 60. The output of comparator 55 is connected to the other input of logical multiplication unit 60. Logical multiplication unit 60 produces signal $S_2$ forming the motor's feeding voltage second component of the corresponding phase. The phase sequence of signals $S_2$-A, $S_2$-B, $S_2$-C depends on the difference between frequencies f=1/T (of signal S) and $f_1=1/T_1$ (of signal $S_{11}$). If the said difference between the frequencies crosses zero, the phase sequence direction is changed. The motor's feeding voltage second component frequency ($f_2=1/T_2$) equals to the frequencies difference $f_2=f-f_1$ for any phase sequence.

In the present version of the embodiment of the invention the polarity synchronization unit 58 is represented by two independent circuits of logical multiplication, two inputs of each of them are connected to the outputs of generator 17 and RS flip flop 18, and the outputs of two independent circuits are connected to the first and second inputs of the logical adding device 59, respectively.

The induction motor start process is occurring as described below.

At the first stage of the induction motor start the low frequency component $S_2$ (FIG. 3g) of the control signal $S_3$ provides the gradual frequency increase (in particular case from zero frequency) of the second component basic harmonic of the motor's feeding voltage 4 with the simultaneous value increase of the second component (FIG. 3h). Thus, the high start torque at the low start current, typical to the variable frequency motor start, is ensured. The motor's angular speed is increasing with the simultaneous increase of the frequency of the second component basic harmonic of the motor's feeding voltage 2. At the certain preset start moment the signal component $S_1$ (FIG. 1c) of the control signal $S_3$ also begins to operate and that leads to the addition of the first component of the feeding voltage to the second component as a result adding to the start torque the torque caused by the basic harmonic of the first component of the motor's feeding voltage 4 at the frequency of the basic harmonic of the voltage 3. The form of the motor's feeding resulting voltage 4 is shown in FIG. 1b. The influence of the first component 1 of the voltage 4 is increasing as the angular speed of the motor is increasing. At the same time the influence of the second component 2 of the voltage 4 is decreasing. When the preset speed of the motor is reached, the second component 2 is removed. At the last stage of the motor start only the first component is applied. The process is concluded when the motor's feeding voltage 4 becomes equal to the feeding voltage 3 both in value and form.

The proposed method and devices bringing it about, allow to implement two versions of the intensive braking with the recuperation of energy.

In the first version, at the initial stage of motor's braking, the value of the motor's feeding voltage first component 1 is decreased gradually up to zero by means of the phase modulation at the frequency of the feeding voltage 3. Simultaneously, or with some delay, the motor's feeding voltage second component 2 is applied. The braking process is completed in the regime of the motor's frequency braking by means of decreasing (in particular case down to zero) the second component frequency and value of the motor's feeding voltage.

In the second version of motor's braking, the motor's feeding voltage second component 2 sets zero frequency after the value of the motor's feeding voltage first component 1 decreases to the value mentioned in the first version, i.e. the process of the dynamic braking occurs.

Recuperation of energy during braking, in both said versions, is possible due to the fact that the motor feeding is carried out through the bidirectional power units.

The proposed method and devices bringing it about also allow to implement smooth regulation of the angular speed up to zero and subsequent transition to the controlled reverse speed. In the latter situation, the motor's feeding voltage second component 2 is dominant, and the first component 1 may be absent, thereby, the motor's angular speed is determined by the second component, and the direction of rotation is determined by the phase sequence of the second components. In one of the version of the embodiment of the invention, the motor's feeding voltages phase sequence and angular speed direction depend on the difference (positive or negative) between feeding voltage frequency f and frequency $f_1$ of variable frequency generator 14, whereas the angular speed of a motor depends on the absolute value of this difference.

Thus, the proposed method, besides solving the soft start problem at the high start torque under the rated start current, simultaneously allows to get the additional advantages such as, intensive braking without impacts, braking energy recuperation, and possible reverse angular speed regulation in wide range with smooth transition through zero speed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method of an induction motor start including a soft start in the final stage, said method using the feeding voltage modulated by the value including the stage before said final stage:
   acquisition of first component of the voltage, feeding the motor, the said first component is increasing in magnitude by means of modulating the value of the feeding voltage,
   acquisition of second component of the voltage, feeding the motor by means of modulating the value and frequency of the feeding voltage,
   simultaneous application of said first and said second components of the voltage to each winding of the motor,
   said second component with initial frequency less than frequency of said first component,
   increasing of said initial frequency of the second component up to its final value which is less than the frequency of said first component.

2. The method according to claim 1 wherein said feeding voltage, said first and said second components of the voltage are multiphase respectively, the phase sequence of said first and said second components are matched, and all said stages before said final stage are implemented for each individual phase of said voltage feeding the motor.

3. The method according to claim 1 wherein said acquisition of the first component of the voltage is Pulse Width Modulation (PWM) at the frequency not lower than the frequency of said feeding voltage and synchronized with the frequency of this feeding voltage.

4. The method according to claim 1 wherein said acquisition of the second component of the voltage is modulation of signals at two frequencies, one of which is not lower than said feeding voltage frequency and synchronized with the latter, and the second of which is lower than said feeding voltage frequency.

5. The method according to claim 1 wherein the current values of at least one control parameter of the motor are determined, and depending on these values, in the process of changing an angular speed of a motor, the ratios of the values of said first and said second components of the voltages as well as the rate of said increase of the frequency of the second component and an angular speed of a motor are changing.

6. The method according to claim 5 wherein the angular velocity of the motor is used as said control parameter.

7. The method according to claim 5 wherein the value of the electric current in the windings of the motor is used as said control parameter.

8. A device for an induction motor start comprising of:
   the first channel forming the first signal, creating the first component of the motor's feeding voltage from the feeding voltage, said first channel containing the set up unit of the value change of said first component,
   the second channel forming the second signal, creating the second component of the motor's feeding voltage from the feeding voltage, said second channel containing:
   a) a set up unit of the value change of said second component, having as an output the signal of the value change of said second component,
   b) a signal generator of second component frequency,
   c) a set up unit of the behavior change of said frequency of the signal generator of second component frequency,
   d) combined said signal of the value change of the second component and said modulating signal of said signal generator of second component frequency of said second component, are said second signal,
   e) a logical multiplication unit of said second signal from said signal of the value change of the second component and said variable frequency modulating signal,
   a logic summation unit of said first and said second signals, said logic summation unit having a control signal as its output,
   a controlled power unit, feeding the motor by the resulting voltage, corresponding to said control signal, said controlled power unit is a bidirectional power unit.

9. The device according to claim 8, wherein said set up unit of the value change of the first component is a set up unit of the pulses width of said first signal, hereby the first channel includes in addition a periodic signal generator of the first component synchronized with the feeding voltage, and a comparator having the signal as the output forming said first signal, the input of said comparator is connected to the output of said periodic signal generator of the first component and to the output of said set up unit of the pulses width.

10. The device according to claim 8, wherein
    said frequency signal generator of second component frequency includes a generator of the variable frequency modulating signal, set up unit, a mixer of the frequency of a signal of said variable frequency signal generator and the frequency of said feeding voltage,
    said set up unit of the value change of the second component contains:
    a) a periodic signal generator of the second component synchronized with the feeding voltage,
    b) a set up unit of pulses width of said second signal,
    c) comparator, inputs of which are connected to the output of a sensor of a current motor's operating parameter and to the output of said set up unit of pulses width of said second signal.

11. The device according to claim 10, wherein said generator of the variable frequency modulating signal contains:
    a forming block which forms two unipolar rectangular signals, one of which is synchronized with the positive and the other with the negative half period of the feeding voltage, there are two logic elements "AND", one of the inputs of each of them is connected to one of the outputs of said forming block, and the signal of said wide range variable frequency generator is applied to the other inputs of each of said two logic elements "AND",
    RS flip flop, to one of the inputs of which the output of one of said elements "AND" is connected, and to the other input of said RS flip flop, the other output of other said element "AND" is connected.

12. The device according to claim 8, wherein:
    said first and second channels, forming, respectively, the first multiphase signal, creating the first components of the multiphase voltage, and the second multiphase signal, creating the second components of the multiphase voltage feeding a motor,
    the means of matching phase sequence of said second multiphase signal with the phase sequence of the first multiphase signal,
    hereby each of said channels consists of subchannels to form each individual phase of the multiphase signal.

13. The device according to claim 12, wherein there is a generator of the variable frequency modulating signal for setting frequencies and phase sequence of said second components of the voltages, hereby, there is a common set up unit controlling said generator of the variable frequency modulating signal, as well as comprising said set up unit of value change of the first component of the voltage and said set up unit of value change of the second component of the voltage.

14. The device according to claim 8, wherein there is a block of polarities matching of said second component and said feeding voltage, hereby said controlled
power unit represents a single bidirectional power unit.

15. The device according to claim 8, wherein there is at least one sensor of a motor's operating parameter and the means of measuring the first and/or the second signal depending on the value of this parameter in order to ensure the preset regime of motor operation.

16. The device according to claim 15, wherein said set up unit of value change of the second component comprises an additional comparator, inputs of said second comparator are connected to the output of the said set up unit of pulses width and to the said sensor of a motor's operating parameter, and output is connected to the input of said comparator of this channel.

\* \* \* \* \*